(12) United States Patent
Mollen

(10) Patent No.: US 10,151,408 B2
(45) Date of Patent: Dec. 11, 2018

(54) PLASTICS MATERIAL HOSE WITH FIBRE REINFORCEMENT

(71) Applicant: NORRES Beteiligungs-GmbH, Gelsenkirchen (DE)

(72) Inventor: Burkhard Mollen, Essen (DE)

(73) Assignee: NORRES Beteiligungs-GmbH, Gelsenkirchen (DE)

( * ) Notice: Subject to any disclaimer, the term of this patent is extended or adjusted under 35 U.S.C. 154(b) by 0 days.

(21) Appl. No.: 15/435,825

(22) Filed: Feb. 17, 2017

(65) Prior Publication Data

US 2017/0248255 A1 Aug. 31, 2017

(30) Foreign Application Priority Data

Feb. 29, 2016 (DE) .................. 10 2016 103 528

(51) Int. Cl.
| | |
|---|---|
| *H01B 1/24* | (2006.01) |
| *F16L 11/127* | (2006.01) |
| *F16L 11/08* | (2006.01) |
| *H01B 3/47* | (2006.01) |
| *H01B 7/16* | (2006.01) |

(Continued)

(52) U.S. Cl.
CPC .......... *F16L 11/127* (2013.01); *F16L 11/085* (2013.01); *H01B 1/24* (2013.01); *H01B 3/47* (2013.01); *H01B 7/16* (2013.01); *H05F 3/02* (2013.01); *H01B 3/441* (2013.01); *H01B 3/443* (2013.01)

(58) Field of Classification Search
CPC .......... H02G 7/00; H02G 15/117; H02G 7/06; H02G 7/12; H02G 15/06; H02G 15/076; H02G 3/088; H02G 3/16; H02G 3/06; H01R 4/66; H01R 13/512; H01R 13/59; H01R 9/03; H01R 9/05; H01R 9/0506; H02B 5/01; H01B 11/06; H01B 11/08; H01B 3/443; H01B 3/441; H01B 7/16; H01B 3/47; H01B 1/24; H05K 1/0254; H05K 1/0306; H05K 1/0313; H05K 1/0353; H05K 1/0366; H05K 1/0373; H05K 1/038; H05K 1/0386; H05K 2201/0141; H05K 2201/0145; H05K 2201/015;

(Continued)

(56) References Cited

U.S. PATENT DOCUMENTS 6,106,027 A * 8/2000 Mulvey .................. E03C 1/0403
285/222.2
6,334,466 B1 * 1/2002 Jani ....................... F16L 11/088
138/126

(Continued)

FOREIGN PATENT DOCUMENTS

| DE | 19724038 C1 | 1/1999 |
|---|---|---|
| DE | 19848172 A1 | 4/2000 |

OTHER PUBLICATIONS

DE 19848172A1 English Translation.*

*Primary Examiner* — Pete T Lee
(74) *Attorney, Agent, or Firm* — The Web Law Firm

(57) ABSTRACT

There is illustrated and described a plastics material hose comprising: a hose wall of plastics material, and an electrical conductor, wherein the electrical conductor is constructed as a braid having a plurality of fibers. In order to achieve compensation for and reliable discharge of electrical charge concentrations with specific disadvantages being avoided, it is proposed that the braid have at least one carbon fiber.

12 Claims, 2 Drawing Sheets

(51) Int. Cl.
*H05F 3/02* (2006.01)
*H01B 3/44* (2006.01)

(58) Field of Classification Search
CPC ... H05K 2201/0154; H05K 2201/0158; H05K 2201/0323; H05F 3/02; F16L 11/085
See application file for complete search history.

(56) References Cited

U.S. PATENT DOCUMENTS

| | | | |
|---|---|---|---|
| 8,176,943 B2* | 5/2012 | Stroempl | F16L 11/125 138/133 |
| 2002/0112770 A1* | 8/2002 | Fisher | F16L 11/081 138/137 |
| 2007/0144756 A1* | 6/2007 | Wenger | F16L 11/127 174/47 |
| 2012/0073856 A1* | 3/2012 | Montena | H01B 11/1813 174/105 R |
| 2013/0051740 A1* | 2/2013 | Fogg | H01B 7/045 385/101 |
| 2015/0354292 A1* | 12/2015 | Frazer | F16L 11/082 428/36.3 |

* cited by examiner

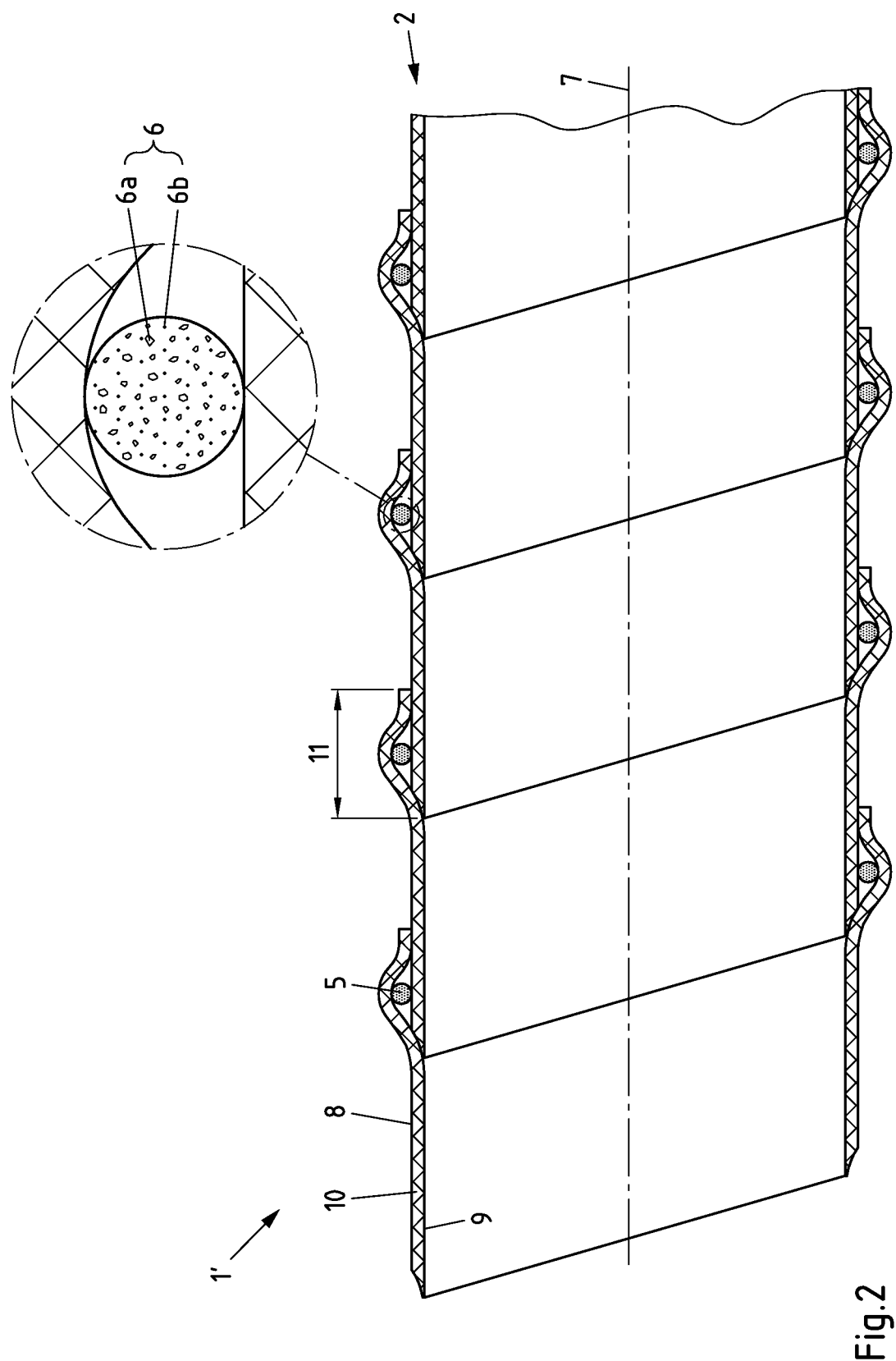

PLASTICS MATERIAL HOSE WITH FIBRE REINFORCEMENT

CROSS-REFERENCE TO RELATED APPLICATION

This application claims priority to German Patent Application No. 10 2016 103 528.9 filed Feb. 29, 2016, the disclosure of which is hereby incorporated in its entirety by reference.

BACKGROUND OF THE INVENTION

Field of the Invention

The invention relates to a plastics material hose, comprising: a hose wall of plastics material, and an electrical conductor, wherein the electrical conductor is constructed as a braid having a plurality of fibres.

Description of Related Art

In the field of hose technology, numerous different hoses are known. As a result of the advantageous material properties and the low costs, plastics material is often used to produce hoses. Such hoses are referred to as plastics material hoses or all-plastics hoses.

A challenge with plastics material hoses is to safely compensate for or discharge electrical charge concentrations. The plastics material types which are typically used to produce hoses are electrically insulating. This results in electrical charge concentrations which are produced, for example, by means of friction of the conveyed material (for example, bulk material, dust or chips) on the inner face of the hose not being able to be discharged. Excessively high charges in plastics material hoses may be discharged in the form of sparks. It is thereby possible, for example, when conveying readily flammable or explosive fluids or gases, for high levels of danger to be produced. Another disadvantage of occurrences of electrical charging is that conveyed material could adhere to the inner face of the hose, whereby the flow resistance increases and an obstruction of the hose could occur.

In the prior art, in order to solve this problem, it has already been proposed that plastics material hoses be provided with an electrical conductor, for example, a copper wire. During the production of the hose, the copper wire is placed onto the hose wall, for example, from the outer side and secured at that location. Alternatively, the copper wire may also be integrated in the hose wall by the copper wire being cast with plastics material during the production of the hose or surrounded in another manner.

As a result of the good electrical conductivity of copper, the described procedure serves to discharge charges from the hose; however, it also has disadvantages. One disadvantage is the low level of expandability of copper, which reduces the mechanical properties of the hose, in particular the flexibility. Copper further has a high density which increases the weight of the hose. The high costs of copper are also disadvantageous. In addition, the good thermal conductivity of copper during the production of the hose may lead to process disruptions.

SUMMARY OF THE INVENTION

An object of the invention is therefore to configure and develop a plastics material hose of the type mentioned in the introduction and described in greater detail above in such a manner that the plastics material hose can safely compensate for or discharge electrical charge concentrations with the previously mentioned disadvantages being avoided.

Hoses of plastics material are distinguished inter alia by means of variable shaping, high flexibility, low weight and low costs. The plastics material hose comprises a hose wall of plastics material and an electrical conductor. The electrical conductor serves to safely compensate for electrical charge concentrations or to discharge them from the hose. The electrical conductor is constructed as a braid with a plurality of fibres. In contrast to individual wires, braids have the advantage of being more flexible. Another advantage is that, with a braid, different fibres can be combined with each other, for example, interwoven with each other. In this manner, it is possible to combine the advantageous properties of different materials with each other.

According to the invention, the braid has at least one carbon fibre. Carbon fibres are fibres of carbon-containing starting materials. They are electrically conductive and therefore serve to discharge charges from the hose. Carbon fibres are further distinguished by a density which is significantly reduced in comparison with other electrical conductors (for example, copper) so that the weight of the plastics material hose remains low. The number of fibres of the braid is preferably in the range between 2 and 25.

According to an embodiment of the plastics material hose, there is provision for the braid to have at least one plastics material fibre, in particular at least one polyester fibre. Plastics material fibres can be produced in a more cost-effective manner and are particularly flexible so that the overall rigidity of the plastics material hose does not increase in a disadvantageous manner. Furthermore, plastics material fibres increase the axial tensile stiffness and tensile strength of the braid. Polyester is distinguished by low costs and high strength. In addition, polyester can be very easily processed in order to form thin polyester fibres or polyester yarns. For example, non-woven materials or micro-fibre materials often comprise polyester. In comparison with a pure copper braid, a braid of a combination of carbon fibres and plastics material fibres is significantly more flexible, can be produced in a more cost-effective manner and has greater strength.

In another embodiment of the plastics material hose, there is provision for the braid to have an electrical resistance of $10^3$ Ohm or less. Materials with an electrical resistance of $10^3$ Ohm or less are frequently described as electrically conductive. The lower the electrical resistance of the braid is, the more successful are a uniform charge distribution within the hose and a discharge of charges from the hose. The conductivity of the braid is achieved by means of the carbon fibres.

Another embodiment of the plastics material hose makes provision for the hose wall to be produced from a plastics material, in particular from TPU (thermoplastic polyurethane), PVC (polyvinyl chloride), TPE (thermoplastic elastomers) or PE (polyethylene) which has a hardness in the range between 50 Shore-A and 90 Shore-A. Shore-A is measured by a needle with a blunted tip being pressed into the plastics material to be examined in order to measure the penetration depth. The end face of the truncated cone has a standard diameter of 0.79 millimetres, the opening angle is 35°, the bearing weight 1 kg and the dwell time 15 s.

Another embodiment of the plastics material hose is characterised by a reinforcement which has a higher rigidity than the hose wall. The term reinforcement is intended to be understood to be a reinforcement of the hose which increases its rigidity—thus, its resistance against deformation. The rigidity which is increased with respect to the hose wall can be achieved by the reinforcement being produced from a different plastics material from that of the hose wall or from metal. Alternatively, the hose wall and the reinforcement may also be produced from the same plastics material, but contain different additives in order to achieve different mechanical properties. The reinforcement may, for example, be constructed in a helical or annular manner and consequently be guided around the hose. In particular, the reinforcement may extend in a helical or annular manner around a centre axis which extends in the longitudinal direction of the hose. A reinforcement which extends in such a manner has the advantage that the rigidity of the hose increases in a radial direction so that the—preferably round—cross-section shape of the hose is maintained in the reinforced region. At the same time, as a result of a helically or annularly extending reinforcement, the flexural strength is increased only in an insignificant manner or not at all so that a hose with such a reinforcement can further be bent and can be laid in a curved manner. As a result of the reinforcement, the collapse of the hose during below atmospheric pressure (vacuum) applications is prevented. Another advantage of helical or annular reinforcements is that the hose can be compressed in the longitudinal direction. The strength or the diameter of the reinforcement may be in the range between 1 mm and 10 mm.

With respect to the reinforcement, it is further proposed that the reinforcement be produced from a plastics material, in particular from TPU (thermoplastic polyurethane), PVC (polyvinyl chloride) or PE (polyethylene) and have a hardness in the range between 30 Shore-D and 60 Shore-D. Talcum, chalk or glass fibres can be used as fillers for the reinforcement. Shore-D is measured in accordance with standards by a needle which tapers with a 30° angle and which has a spherical tip with a radius of 0.1 mm being pressed into the plastics material to be examined in order to measure the penetration depth. The bearing weight is 5 kg and the dwell time 15 s.

With respect to the reinforcement, it is further proposed that the reinforcement be constructed in a helical manner. In particular, the reinforcement may extend in a helical manner about a centre axis which extends in the longitudinal direction of the hose. Alternatively, the reinforcement may extend around the centre axis in an annular manner. The term reinforcement is intended to be understood to be a reinforcement of the hose which increases its rigidity. A reinforcement which extends in a helical or annular manner has the advantage that the rigidity of the hose increases in a radial direction so that the cross-section surface-area of the hose in the reinforced region is retained. A sufficiently high level of radial rigidity is required, for example, with applications at reduced pressure (vacuum) in order to prevent the hose from collapsing. At the same time, as a result of a reinforcement which extends in a helical or annular manner, the flexural rigidity of the hose is increased only in an insignificant manner so that a hose with such a reinforcement can be further bent and can be laid in a curved manner. Another advantage of helical or annular reinforcements is that the hose can be compressed in the longitudinal direction.

According to another embodiment of the plastics material hose, the reinforcement may be integrated in the hose wall and in particular be surrounded completely by the material of the hose wall. Alternatively, there may be provision for the reinforcement to be arranged on the outer face of the hose wall. An integration of the reinforcement in the hose wall has the advantage that the reinforcement is connected to the hose in a particularly secure manner and cannot become detached therefrom. In addition, both the inner face and the outer face of the hose can be constructed to be smooth and even with an integrated reinforcement. Finally, an integrated reinforcement is protected in a particularly effective manner from environmental influences by the hose wall which surrounds it. An arrangement of the reinforcement on the outer face of the hose wall has in this regard the advantage of simplified production of the hose. In particular the reinforcement can be subsequently fixed to the outer face of the hose wall.

In another embodiment of the plastics material hose, there is provided an inner layer which extends over the entire inner face of the plastics material hose. The inner layer is also referred to as an inliner and is in direct contact with the conveyed material which is conveyed through the hose. The inner layer of the hose is subjected to particular demands as a result of the friction of the conveyed material on the inner face of the inner layer. The inner layer may therefore be produced from a particularly abrasion-resistant material. Furthermore, the inner layer is responsible for the tightness of the hose so that, for this layer, particularly gas-tight and fluid-tight materials can be used. There is provision for the inner layer to extend over the entire inner face of the hose. That is to say, the inner layer is intended to cover the entire inner face of the hose. This has the advantage that the entire face which comes into contact with the conveyed material has the same—desired—properties. The inner layer may in particular be produced from TPU (thermoplastic polyurethane), PVC (polyvinyl chloride), TPE (thermoplastic elastomers) or PE (polyethylene). For technical reasons relating to flow, the inner face of the inner layer is preferably constructed in a smooth manner.

With regard to this embodiment, it is further proposed that the inner layer be produced from an antistatic/dissipative or electrically conductive plastics material. The term "antistatic plastics material" is intended in particular to be understood to be a plastics material whose electrical resistance is in the range between $10^3$ Ohm and $10^9$ Ohm. The term "electrically conductive plastics material" is intended in particular to be understood to be a plastics material whose electrical resistance is $10^3$ Ohm or less. These types of plastics materials have the advantage that charge transfers which are produced in the hose can be compensated for again since the charge carriers, in particular electrons, can move and be distributed as a result of the properties of these plastics materials. By an inner layer of an antistatic or electrically conductive plastics material being used, charges which are distributed in a non-uniform manner can be returned in a particularly rapid and effective manner to a uniform distribution. This is because a layer enables the movement of the charge carriers in each direction located within the layer, whilst the charges in thin earth braids can move only in the direction of the braid. The arrangement of the layer on the inner side of the hose has a plurality of advantages. First, a large number of charge transfers or charge concentrations are produced as a result of the friction of the conveyed material on the inner face of the hose. Since, precisely at this location, the inner layer comprising an antistatic or electrically conductive plastics material is provided, in an ideal case the production of charge concentrations can already be prevented. In addition, an arrangement of the layer on the inner side of the hose has the advantage that readily flammable or explosive conveyed material is protected from spark discharges by the inner layer. Finally, as a result of the increased contact face between the hose wall and inner layer, a more reliable connection can be achieved between two materials than would be possible with metal earth braids with a small cross-section.

According to another embodiment of the hose, there is provision for the braid to be arranged between the hose wall and the inner layer. This arrangement brings about a simplification of the production since the metal conductor is arranged in the form of the braid between two other layers, that is to say, the hose wall and the inner layer, and consequently does not need to be integrated in one of the layers.

Another embodiment of the plastics material hose makes provision for the hose wall to be produced from one or more helically wound plastics material strips. In this type of production, a plastics material strip is wound in a helical manner, wherein the edge regions of the plastics material strip overlap. The overlapping edge regions are subsequently welded or adhesively bonded to each other so that a reliable sealing of the seam location is achieved. In addition, in the region of the overlap, a reinforcement or an electrical conductor may also be arranged, whereby a helical path is also achieved. Such a hose is, as a result of the helical winding of plastics material strips, also referred to as a "stripwound hose"; a method for the production thereof is described, for example, in DE 198 48 172 A1.

With regard to this production method, it is further proposed that the plastics material strip which forms the hose wall have edge regions which are arranged so as to overlap and which are connected to each other in a materially engaging manner in the region of the overlap. The materially engaging connection may in particular be produced by means of adhesive and/or welding methods. As a result of a materially engaging connection, a particularly reliable sealing of the seam location is achieved.

In this regard, it is finally proposed that the braid be arranged between the overlapping edge regions of the plastics material strip. As a result of this arrangement, the braid is protected from environmental influences, whereby, for example, the risk of corrosion is reduced. In particular, the braid may be arranged in a hollow space which is formed between the overlapping edge regions of the plastics material strip. The hollow space enables a defined arrangement or positioning of the braid. In addition, the braid is protected particularly well from environmental influences as a result of the arrangement in the hollow space. The hollow space may, for example, be achieved by means of two weld or adhesive seams which extend parallel with each other or which are spaced apart from each other.

BRIEF DESCRIPTION OF THE DRAWINGS

The invention is explained in greater detail below with reference to the drawings, which are merely illustrative and do not limit the scope of the invention. In the drawings:

FIG. 2 is a sectioned view of a second embodiment of a plastics material hose according to the invention.

DETAILED DESCRIPTION

Figure 1:
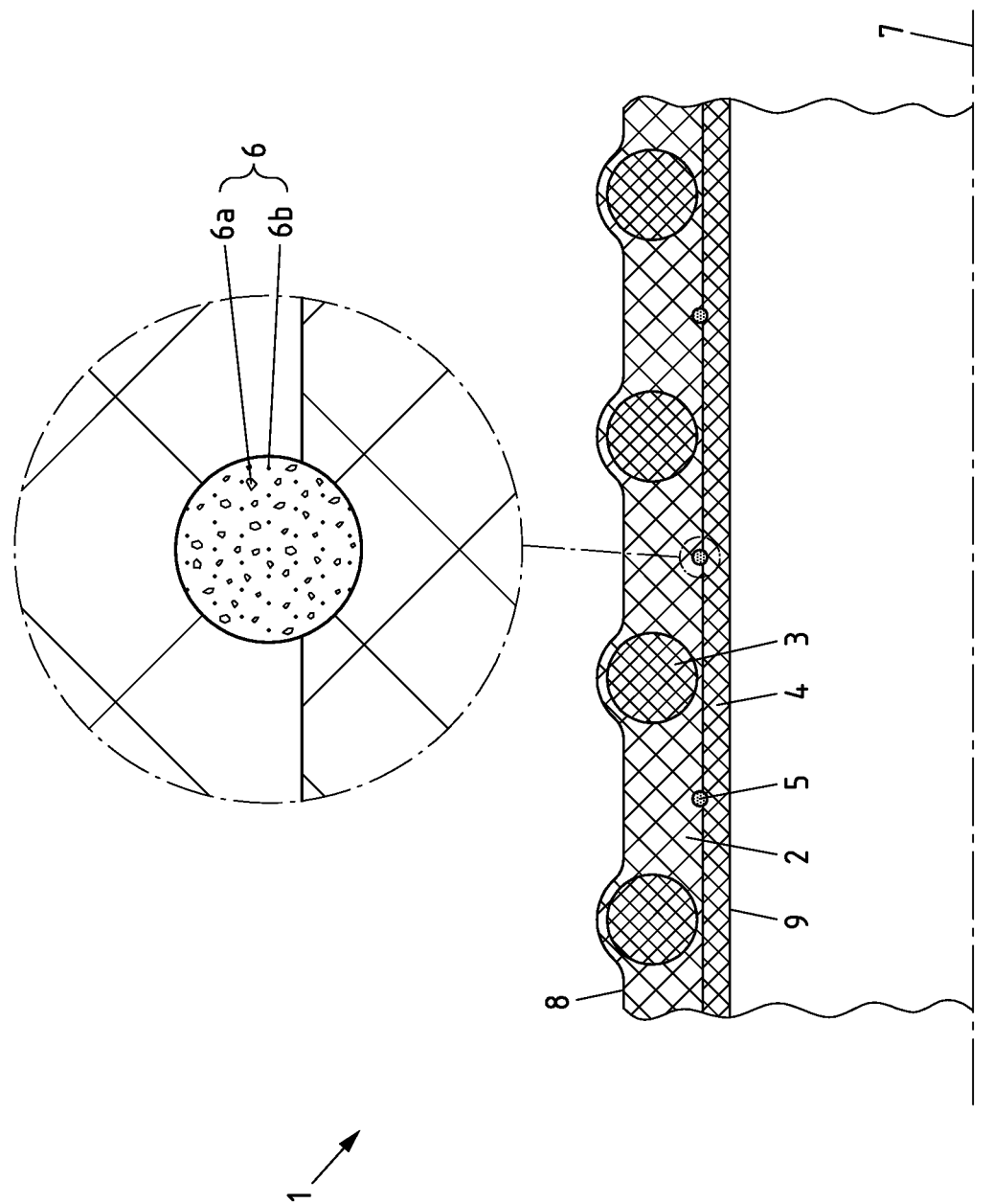
FIG. 1 is a sectioned view of a first embodiment of a plastics material hose according to the invention.

FIG. 1 shows a plastics material hose 1 according to the invention in a first embodiment. The illustration selected for FIG. 1 is a section through the hose wall in the longitudinal direction of the plastics material hose 1. The plastics material hose 1 comprises a hose wall 2 of plastics material, a helical reinforcement 3 of plastics material and an inner layer 4 which is also produced from plastics material. The inner layer 4 preferably contains an antistatic or conductive carbon black. The plastics material hose 1 additionally comprises an electrical conductor 5 which, in the embodiment which is illustrated in FIG. 1 and which is preferred in this regard is constructed as a braid with a plurality of fibres 6. The fibres are carbon fibres 6A and plastics material fibres 6B. The metal conductor 5 extends in a helical manner and is arranged between the hose wall 2 and the inner layer 4 so that the metal conductor 5 is continuously in contact with the inner layer 4 and touches it.

The plastics material hose 1 extends symmetrically about a centre axis 7 which extends in the longitudinal direction of the plastics material hose 1 so that, in FIG. 1, the illustration of the lower half of the plastics material hose 1 can be dispensed with. The reinforcement 3 is constructed in a helical manner in the embodiment which is preferred in this regard and which is illustrated in FIG. 1, and is integrated in the hose wall 2 so that the reinforcement 3 is completely surrounded by the material of the hose wall 2. The inner layer 4 is produced from an antistatic, in particular electrically conductive, plastics material and completely lines the inner side of the plastics material hose 1.

The plastics material hose has an outer face 8 and an inner face 9, wherein in the plastics material hose 1 illustrated in FIG. 1 by way of example, the outer face 8 is formed by the hose wall 2 and wherein the inner face 9 is formed by the inner layer 4. As a result of the considerable thickness of the reinforcement 3, the outer face 8 of the plastics material hose 1 is curved outwards in the region of the reinforcement 3.

FIG. 2 is a sectioned view of a second embodiment of a plastics material hose 1' according to the invention. Those regions of the plastics material hose 1' which have already been described in connection with FIG. 1 are provided with corresponding reference numerals in FIG. 2. The plastics material hose 1' is produced from a plastics material strip 10. In this type of production, a plastics material strip 10 is wound in a helical manner, wherein the edge regions of the plastics material strip 10 form an overlap 11. The overlapping edge regions of the plastics material strip 10 are subsequently welded to each other or adhesively bonded so that reliable sealing of the seam location is achieved. The plastics material hose 1' produced in this manner extends symmetrically about a centre axis 6 which extends in the longitudinal direction of the hose 1', wherein the welded or adhesively-bonded plastics material strip 10 forms a hose wall 2. Preferably, the material of the plastics material strip 10 contains an antistatic.

The plastics material hose 1' which is illustrated in FIG. 2 has an electrical conductor 5 which in the embodiment which is preferred in this regard and which is illustrated in FIG. 2 is also constructed as a braid having a plurality of fibres 6. The fibres 6 are carbon fibres 6A and plastics material fibres 6B. In the second embodiment of the plastics material hose 1', the electrical conductor 5 is arranged in the region of the overlap 11, that is to say, between the overlapping edge regions of the plastics material strip 10.

LIST OF REFERENCE NUMERALS 1, 1': Plastics material hose
2: Hose wall
3: Reinforcement
4: Inner layer
5: Electrical conductor
6: Fibre
6A: Carbon fibre
6B: Plastics material fibre
7: Centre axis
8: Outer face (of the plastics material hose 1)

9: Inner face (of the plastics material hose 1)
10: Plastics material strip
11: Overlap

The invention claimed is:

1. A plastics material hose comprising:
a hose wall of plastics material, and
an electrical conductor,
wherein the electrical conductor is constructed as a braid having a plurality of fibers, and
wherein:
the braid has at least one carbon fiber;
the braid has at least one plastics material fiber;
the hose wall is produced from one or more helically wound plastics material strips;
the plastics material strip which forms the hose wall has edge regions which are arranged so as to overlap and which are connected to each other in a materially engaging manner in the region of the overlap; and
the braid is arranged between the overlapping edge regions of the plastics material strip.

2. The plastics material hose according to claim 1, wherein the braid has an electrical resistance of $10^3$ Ohm or less.

3. The plastics material hose according to claim 1, wherein the hose wall is produced from a plastics material, in particular from TPU, PVC, TPE or PE, which has a hardness in the range between 50 Shore-A and 90 Shore-A.

4. The plastics material hose according to claim 1, further comprising a reinforcement which has a higher rigidity than the hose wall.

5. The plastics material hose according to claim 4, wherein the reinforcement is produced from a plastics material and has a hardness in the range between 30 Shore-D and 60 Shore-D.

6. The plastics material hose according to claim 4, wherein the reinforcement is constructed in a helical manner.

7. The plastics material hose according to claim 4, wherein the reinforcement is integrated in the hose wall.

8. The plastics material hose according to claim 1, further comprising an inner layer which extends over the entire inner face of the plastics material hose.

9. The plastics material hose according to claim 8, wherein the inner layer is produced from an antistatic/dissipative or electrically conductive plastics material.

10. The plastics material hose according to claim 8, wherein the braid is arranged between the hose wall and the inner layer.

11. The plastics material hose according to claim 1, wherein the at least one plastics material fiber comprises at least one polyester fiber.

12. The plastics material hose according to claim 5, wherein the reinforcement comprises TPU, PVC, or PE.

* * * * *